US012570180B2

(12) United States Patent
Yamada

(10) Patent No.: US 12,570,180 B2
(45) Date of Patent: Mar. 10, 2026

(54) CONTROL DEVICE FOR ELECTRIFIED VEHICLE

(71) Applicant: TOYOTA JIDOSHA KABUSHIKI KAISHA, Toyota (JP)

(72) Inventor: Tomohiro Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 18/407,779

(22) Filed: Jan. 9, 2024

(65) Prior Publication Data

US 2024/0343155 A1 Oct. 17, 2024

(30) Foreign Application Priority Data

Apr. 11, 2023 (JP) ................................. 2023-064306

(51) Int. Cl.
*B60L 58/12* (2019.01)
(52) U.S. Cl.
CPC ......... *B60L 58/12* (2019.02); *B60L 2240/547* (2013.01)
(58) Field of Classification Search
CPC .... B60L 58/12; B60L 2240/547; B60L 50/51; B60L 2240/423; B60L 1/00; B60L 2210/10; B60L 2210/12; B60L 2240/527; B60L 2240/549; B60L 50/16; B60L 58/20; B60W 20/00; H02J 7/0029; H02J 7/00712; H02J 7/007182; H02J 7/007194
See application file for complete search history.

(56) References Cited

U.S. PATENT DOCUMENTS

2022/0297563 A1* 9/2022 Jo ..................... H02J 7/007188

FOREIGN PATENT DOCUMENTS

| | | |
|---|---|---|
| JP | 2012-166675 A | 9/2012 |
| JP | 2021-141762 A | 9/2021 |
| WO | 2012/110870 A2 | 8/2012 |

* cited by examiner

*Primary Examiner* — Alan D Hutchinson
(74) *Attorney, Agent, or Firm* — SoraIP, Inc.

(57) ABSTRACT

A control device for an electrified vehicle includes a travel ECU that controls the travel of the electrified vehicle, and an auxiliary ECU that controls the voltage of an auxiliary battery separately from the travel ECU. The auxiliary ECU receives battery information indicating the state of the auxiliary battery from the travel ECU, generates a voltage request signal that requests voltage from the DC-DC converter based on the battery information, and sends the voltage request signal to the travel ECU. When the travel ECU receives the voltage request signal from the auxiliary ECU, it outputs a control signal corresponding to the voltage request signal to the DC-DC converter.

9 Claims, 1 Drawing Sheet

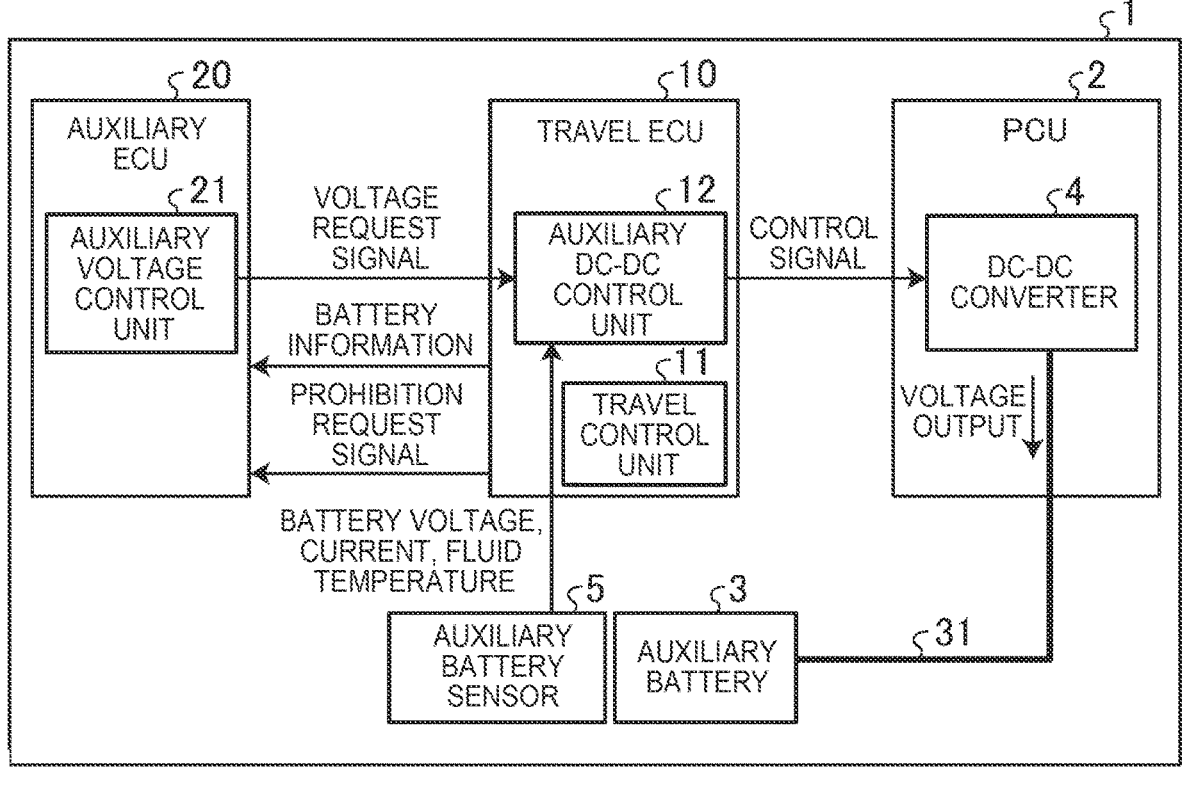

CONTROL DEVICE FOR ELECTRIFIED VEHICLE

CROSS-REFERENCE TO RELATED APPLICATION

This application claims priority to Japanese Patent Application No. 2023-064306 filed on Apr. 11, 2023, incorporated herein by reference in its entirety.

BACKGROUND

1. Technical Field

The present disclosure relates to control devices for electrified vehicles.

2. Description of Related Art

Japanese Unexamined Patent Application Publication No. 2012-166675 (JP 2012-166675 A) discloses performing a travel control and an auxiliary voltage control in the same ECU mounted on a vehicle.

SUMMARY

However, there are a wide variety of low voltage components that operate at low voltage, such as accessories for electrified vehicles. Since the various low voltage components are involved in the auxiliary voltage control, the control requirements for the auxiliary voltage control become complicated. For original equipment manufacturer (OEM) vehicles, a consignor designs accessories. Therefore, when a consignee manufactures an ECU that performs the travel control, it is difficult to perform the auxiliary voltage control in this ECU so as to deal with the various low voltage components.

The present disclosure was made in view of the above circumstances, and it is an object of the present disclosure to provide a control device for an electrified vehicle that can perform an auxiliary voltage control adapted to various low voltage components.

The present disclosure is a control device for an electrified vehicle. The control device includes:

a travel control device configured to control travel of the electrified vehicle; and an auxiliary voltage control device separate from the travel control device and configured to control a voltage of an auxiliary battery.

The auxiliary voltage control device is configured to receive battery information indicating a state of the auxiliary battery from the travel control device, generate a voltage request signal based on the battery information, the voltage request signal being a signal requesting a voltage to a converter configured to output a voltage to the auxiliary battery, and transmit the generated voltage request signal to the travel control device.

The travel control device is configured to output a control signal according to the voltage request signal to the converter, in response to the voltage request signal received from the auxiliary voltage control device.

According to this configuration, the travel control and auxiliary voltage control for the electrified vehicle are performed by separate control devices. This eliminates the need to perform the auxiliary voltage control by the travel control device, and allows the auxiliary voltage control device to determine the lowest voltage and the operation conditions to perform the auxiliary voltage control. It is therefore possible to perform the auxiliary voltage control adapted to various low voltage components.

The auxiliary voltage control device may be configured to prohibit transmission of the voltage request signal to the travel control device when a predetermined prohibition condition is satisfied.

According to this configuration, since the prohibition condition is provided, it is possible to prohibit transmission of the voltage request signal as necessary. It is therefore possible to protect those in-vehicle components that are affected by changes in voltage of the auxiliary battery.

The auxiliary voltage control device may be configured to perform an auxiliary voltage control to lower the voltage of the auxiliary battery as necessary, and transmit the voltage request signal to the travel control device when performing the auxiliary voltage control.

The travel control device may be configured to transmit a prohibition request signal to the auxiliary voltage control device when a predetermined condition is satisfied, the prohibition request signal being a signal requesting prohibition of the auxiliary voltage control.

According to this configuration, the auxiliary voltage control of lowering the voltage of the auxiliary battery can be prohibited as necessary. It is therefore possible to protect those in-vehicle components that are affected by drops in voltage of the auxiliary battery.

In the present disclosure, the travel control and auxiliary voltage control for the electrified vehicle are performed by separate control devices. This eliminates the need to perform the auxiliary voltage control by the travel control device, and allows the auxiliary voltage control device to determine the lowest voltage and the operation conditions to perform the auxiliary voltage control. It is therefore possible to perform the auxiliary voltage control adapted to various low voltage components.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic diagram showing a control device for an electrified vehicle in an embodiment.

DETAILED DESCRIPTION OF EMBODIMENTS

Hereinafter, a control device for an electrified vehicle according to an embodiment of the present disclosure will be specifically described. The present disclosure is not limited to the embodiments described below.

FIG. 1 is a schematic diagram showing a control device for an electrified vehicle in an embodiment. The electrified vehicle 1 includes a motor as a power source and a battery that stores electric power to be supplied to the motor, and generates driving force by supplying electric power from the battery to the motor to drive the motor and travels. In this electrified vehicle 1, power output from a motor is transmitted to wheels via a transaxle. For example, the electrified vehicle 1 is configured by a battery electric vehicle or a hybrid electric vehicle. Additionally, this battery is a high voltage battery.

The electrified vehicle 1 includes a power control unit (hereinafter referred to as PCU) 2, an auxiliary battery 3, a travel ECU 10, and an auxiliary ECU 20.

Further, the electrified vehicle 1 can be applied to an OEM vehicle. For example, a consignee manufactures a drive device, and a consignor sells an electrified vehicle 1 equipped with the drive device. The drive device includes an engine, motor, battery, transaxle, PCU 2, and travel ECU 10. In this case, the consignor can manufacture the auxiliary battery 3 and the auxiliary ECU 20, and manufacture the electrified vehicle 1 by assembling the drive device procured by the consignee. In this case, the consignor can design components other than the drive device, such as low-voltage components such as accessories, which operate at low voltage. Therefore, in the electrified vehicle 1, the travel ECU 10 and the auxiliary ECU 20 are configured as separate devices. In the embodiment, the electrified vehicle 1 is an OEM vehicle, the consignee manufactures the PCU 2 and the travel ECU 10, and the consignor manufactures the auxiliary ECU 20.

Specifically, the PCU 2 is a power conversion unit that includes a DC-DC converter 4 that supplies power to an auxiliary battery 3 and an inverter that drives a motor. The motor is electrically connected to the battery via an inverter. The inverter converts battery power and supplies it to the motor. The inverter has a plurality of switching elements, and the switching elements are configured to perform a switching operation.

The auxiliary battery 3 is a low voltage battery that discharges and charges low voltage power that allows auxiliary equipment to operate. The auxiliary battery 3 is constituted by a secondary battery such as a lithium ion battery or a lead acid battery. Auxiliary battery 3 is electrically connected to DC-DC converter 4 via low voltage line 31. The auxiliary battery 3 can be charged with the power output from the DC-DC converter 4. The voltage of the auxiliary battery 3 is lower than the voltage of the battery included in the drive device, for example, about 12V.

The auxiliary equipment is low-voltage components that operate with power (approximately 12V power) supplied from the low-voltage line 31. A DC-DC converter 4, an auxiliary battery 3, and an auxiliary device are electrically connected to the low voltage line 31. The auxiliary equipment includes, for example, a headlight system, an audio device, various sensors, a power window device, a lighting device, a wiper device, a navigation device, and the like.

The DC-DC converter 4 is a converter that functions as an auxiliary device DC-DC. Further, the DC-DC converter 4 is electrically connected to a battery via an inverter. The battery can supply high voltage power to the DC-DC converter 4. The DC-DC converter 4 steps down the high DC voltage of the battery to a low DC voltage, and supplies the stepped down DC voltage to the auxiliary battery 3 and the auxiliary equipment. That is, the DC-DC converter 4 converts the voltage of the DC power received from the battery into a voltage for charging the auxiliary battery 3, and outputs the voltage to the auxiliary battery 3. The auxiliary battery 3 is charged by outputting voltage from the DC-DC converter 4 to the auxiliary battery 3. The DC-DC converter 4 is electrically connected between the high-voltage side power line and the low-voltage line 31 and can step down the power between the high-voltage side power lines and supply it to the low-voltage line 31.

The travel ECU 10 is an electronic control device that controls the drive device of the electrified vehicle 1. The travel ECU 10 is a travel control device that controls the travel of the electrified vehicle 1, and is an HEV-ECU. The travel ECU 10 includes a processor and memory. The processor consists of a central processing unit (CPU) and the like. Memory is a main storage device, and includes random access memory (RAM), read only memory (ROM), and the like. The travel ECU 10 loads the program stored in the storage unit into the working area of the memory (main memory) and executes it, and controls each component through the execution of the program to perform functions that meet the specified purpose. Realize. The storage unit is composed of recording media such as erasable programmable ROM (EPROM), hard disk drive (HDD), and removable media. Examples of removable media include disc recording media such as universal serial bus memory (USB memory), compact disc (CD), digital versatile disc (DVD), and Blu-ray (registered trademark) Disc (BD). The storage unit can store an operating system (OS), various programs, various tables, various databases, and the like. Signals from various sensors are input to travel ECU 10. The travel ECU 10 then executes various controls based on signals input from various sensors.

The travel ECU 10 includes a travel control unit 11 and an auxiliary DC-DC control unit 12.

The travel control unit 11 is a control unit that controls the drive device of the electrified vehicle 1. The drive devices controlled by the travel control unit 11 include an engine, a motor, a battery, a transaxle, and an inverter of the PCU 2. The travel control unit 11 is a control unit that performs a travel control of the electrified vehicle 1.

The auxiliary DC-DC control unit 12 is a control unit that controls the DC-DC converter 4 of the PCU 2. The auxiliary DC-DC control unit 12 outputs a control signal to the DC-DC converter 4. The DC-DC converter 4 outputs a voltage to the low voltage line 31 in response to a control signal from the auxiliary DC-DC control unit 12.

A signal from the auxiliary battery sensor 5 is input to the travel ECU 10. The auxiliary battery sensor 5 is a sensor for monitoring the state of the auxiliary battery 3. The auxiliary battery sensor 5 includes a voltage sensor that detects the voltage of the auxiliary battery 3 (battery voltage), a current sensor that detects the input/output current (battery current) of the auxiliary battery 3, and a current sensor that detects the fluid temperature of the auxiliary battery 3 (battery fluid temperature). The voltage sensor detects the voltage of the auxiliary battery 3 and outputs the detection signal to the travel ECU 10. The current sensor detects the input/output current of the auxiliary battery 3 and outputs the detection signal to the travel ECU 10. The temperature sensor detects the fluid temperature of the auxiliary battery 3 and outputs the detection signal to the travel ECU 10. The travel ECU 10 then generates battery information indicating the state of the auxiliary battery 3 based on the signal input from the auxiliary battery sensor 5. The battery information is information including the voltage, current, and fluid temperature of the auxiliary battery 3.

Furthermore, travel ECU 10 transmits battery information to auxiliary ECU 20. The travel ECU 10 and the auxiliary ECU 20 are connected so that they can send and receive information. The travel ECU 10 transmits a signal including battery information to auxiliary ECU 20 as a signal necessary for calculating the auxiliary voltage. In the electrified vehicle 1, signals necessary for calculating the target voltage of the auxiliary battery 3 are transmitted to the auxiliary ECU 20 via the travel ECU 10.

The auxiliary ECU 20 is an electronic control device that controls the voltage of an auxiliary battery 3. Auxiliary ECU 20 has the same hardware configuration as travel ECU 10. The auxiliary ECU 20 is an auxiliary control device that performs the auxiliary voltage control, and is an OEM-ECU manufactured by the consignor. The auxiliary ECU 20 controls the voltage of the auxiliary battery 3 using the battery information received from the travel ECU 10.

The auxiliary ECU 20 has an auxiliary voltage control unit 21.

The auxiliary voltage control unit 21 is a control unit that performs an auxiliary voltage control. The auxiliary voltage control is a control that lowers the voltage of the auxiliary battery 3 compared to normal times. This auxiliary voltage control is a control for improving the fuel efficiency of the electrified vehicle 1, and is a control for reducing the voltage of the auxiliary battery 3 as necessary. For example, the auxiliary voltage control includes control to lower the voltage of the auxiliary battery 3 to the necessary minimum when it is not needed.

The auxiliary voltage control unit 21 generates a voltage request signal for requesting voltage from the DC-DC converter 4 based on the battery information. The voltage request signal includes a voltage value as a target voltage calculated based on battery information. The auxiliary voltage control unit 21 executes control to determine the minimum voltage of the auxiliary battery 3 and the operating conditions of low voltage components. The target voltage included in the voltage request signal is determined based on this operating condition and the minimum voltage. This minimum voltage is the lowest voltage that can be set as the voltage of the auxiliary battery 3 when performing auxiliary voltage control.

Then, the auxiliary voltage control unit 21 transmits the generated voltage request signal to the travel ECU 10. That is, the auxiliary ECU 20 transmits a voltage request signal for controlling the voltage of the auxiliary battery 3 to the travel ECU 10.

When travel ECU 10 receives a voltage request signal from auxiliary ECU 20, it outputs a control signal according to the voltage request signal to DC-DC converter 4. The DC-DC converter 4 outputs a voltage according to the control signal to the low voltage line 31.

Further, the travel ECU 10 can reject or prohibit a voltage request signal from the auxiliary ECU 20 in order to protect the drive device.

For example, when a predetermined condition such as a drive device protection request is satisfied, travel ECU 10 transmits a prohibition request signal requesting prohibition of the auxiliary voltage control to the auxiliary ECU 20. The drive device protection requests include cases where there is a high need to cool the battery, cases where there is a high need to cool the PCU 2, etc. In addition, the drive unit is protected when the electrified vehicle 1 is accelerating, when the radiator fan is running, when the battery (high voltage battery) temperature is high, or when the coolant of PCU 2 is turned on high. A demand arises. The travel ECU 10 executes processing to determine whether a predetermined condition, such as a request for protection of the drive device, is met.

When the auxiliary ECU 20 receives the prohibition request signal from the travel ECU 10, it prohibits the transmission of the voltage request signal to the travel ECU 10. The auxiliary ECU 20 executes a process of determining whether a predetermined prohibition condition is satisfied by determining whether a prohibition request signal is received. The auxiliary ECU 20 prohibits transmitting a voltage request signal to travel ECU 10 when a predetermined prohibition condition is met. The prohibition conditions include a case where a prohibition request signal is received from the travel ECU 10.

The travel ECU 10 may be configured so that the auxiliary ECU 20 determines whether a drive device protection request occurs, without determining whether there is a drive device protection request. In this case, the travel ECU 10 is configured to transmit information necessary for determining whether or not there is a protection request for the drive device to the auxiliary ECU 20. Then, the auxiliary ECU 20 determines whether the prohibition condition is satisfied by determining whether a protection request for the drive device occurs. When the auxiliary ECU 20 determines that the prohibition condition is satisfied, it prohibits the transmission of the voltage request signal to the travel ECU 10.

Furthermore, the electrified vehicle 1 is not limited to an OEM vehicle. That is, the travel ECU 10 and the auxiliary ECU 20 may both be the electrified vehicle 1 made by the same manufacturer.

What is claimed is:

1. A control device for an electrified vehicle, the control device comprising:

a first processor configured to control a drive device of the electrified vehicle and a converter of the electrified vehicle, the converter being configured to output a voltage to an auxiliary battery of the electrified vehicle, the auxiliary battery being configured to supply power to an auxiliary device mounted on the electrified vehicle, the drive device including at least one of an engine, a motor, a high-voltage battery, a transaxle, and an inverter, and acquire battery information indicating a state of the auxiliary battery; and a second processor configured to electrically communicate with the first processor, receive the battery information from the first processor, calculate a value of a target voltage of the auxiliary battery based on the battery information, generate a voltage request signal including information on the calculated value, and transmit the generated voltage request signal to the first processor, wherein the first processor is further configured to receive the voltage request signal from the second processor, and cause the converter to output a voltage according to the information on the calculated value included in the voltage request signal, in response to the voltage request signal received from the second processor.

2. The control device according to claim 1, wherein the second processor is configured to prohibit transmission of the voltage request signal to the first processor when a predetermined prohibition condition is satisfied.

3. The control device according to claim 2, wherein the predetermined prohibition condition includes receiving a prohibition request signal from the first processor.

4. The control device according to claim 1, wherein:

the second processor is configured to perform an auxiliary voltage control to lower the voltage of the auxiliary battery as necessary, and transmit the voltage request signal to the first processor when performing the auxiliary voltage control; and the first processor is further configured to transmit a prohibition request signal to the second processor when a predetermined condition is satisfied, the prohibition request signal being a signal requesting prohibition of the auxiliary voltage control.

5. The control device according to claim 4, wherein the prohibition request signal is transmitted in at least one of a case where cooling of the high-voltage battery is required, a case where cooling of the converter or the inverter is required, and a case where the electrified vehicle is accelerating.

6. The control device according to claim 1, wherein the auxiliary device includes at least one of a headlight system, an audio device, a power window device, a wiper device, and a navigation device.

7. The control device according to claim 1, wherein the first processor is manufactured by a manufacturer different from that of the second processor.

8. The control device according to claim 1, wherein the battery information includes a voltage, a current, and a fluid temperature of the auxiliary battery.

9. The control device according to claim 1, wherein the target voltage is determined based on a minimum voltage of the auxiliary battery and operating conditions of the auxiliary device.

* * * * *